US009355065B2

(12) United States Patent
Donahue

(10) Patent No.: US 9,355,065 B2
(45) Date of Patent: May 31, 2016

(54) SYSTEM FOR GATHERING DATA FROM AN INDUSTRIAL VEHICLE

(71) Applicant: The Raymond Corporation, Greene, NY (US)

(72) Inventor: Timothy E. Donahue, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 13/911,419

(22) Filed: Jun. 6, 2013

(65) Prior Publication Data

US 2013/0338874 A1    Dec. 19, 2013

Related U.S. Application Data

(62) Division of application No. 13/524,610, filed on Jun. 15, 2012.

(51) Int. Cl.
*G06F 17/00* (2006.01)
*G07C 5/00* (2006.01)
*G07C 5/08* (2006.01)

(52) U.S. Cl.
CPC ............... *G06F 17/00* (2013.01); *G07C 5/008* (2013.01); *G07C 5/0808* (2013.01)

(58) Field of Classification Search
CPC ....... G06F 17/00; G07C 5/008; G07C 5/0808
USPC .......................... 701/22, 50, 33.2, 34.3; 710/1
See application file for complete search history.

(56) References Cited

U.S. PATENT DOCUMENTS

| | | | |
|---|---|---|---|
| 4,828,066 A | 5/1989 | Hayashi | |
| 5,499,182 A * | 3/1996 | Ousborne | 701/29.6 |
| 5,978,593 A * | 11/1999 | Sexton | 710/1 |
| 6,967,568 B2 | 11/2005 | Ervin | |
| 7,165,643 B2 | 1/2007 | Bozem et al. | |
| 7,992,686 B2 * | 8/2011 | McCabe | 187/224 |
| 2004/0031628 A1 | 2/2004 | Schiebel et al. | |
| 2005/0102081 A1 | 5/2005 | Patterson | |
| 2006/0101311 A1 * | 5/2006 | Lipscomb et al. | 714/47 |
| 2006/0138733 A1 | 6/2006 | Clauson | |
| 2007/0041820 A1 | 2/2007 | Simons | |
| 2008/0154691 A1 | 6/2008 | Wellman et al. | |
| 2009/0099898 A1 | 4/2009 | Ehrman et al. | |
| 2009/0276115 A1 * | 11/2009 | Chen | 701/32 |
| 2011/0010133 A1 * | 1/2011 | Swanson et al. | 702/187 |
| 2011/0022442 A1 * | 1/2011 | Wellman et al. | 705/9 |
| 2011/0264316 A1 * | 10/2011 | McCabe et al. | 701/22 |

* cited by examiner

*Primary Examiner* — Fadey Jabr
*Assistant Examiner* — Aaron L Troost
(74) *Attorney, Agent, or Firm* — Quarles & Brady LLP

(57) ABSTRACT

Operation of an industrial vehicle is managed by systems onboard that vehicle. One such management system monitors operation of vehicle components and produces performance data which is transmitted to an computer at the facility in which the industrial vehicle operates. That system includes an interface module with a plurality of inputs for receiving signals from components on the industrial vehicle. The interface module derives performance data from the signals and conveys the performance data over a communication network. A data acquisition module receives the performance data from the communication network and has a communicator for wirelessly transmitting the performance data.

16 Claims, 5 Drawing Sheets

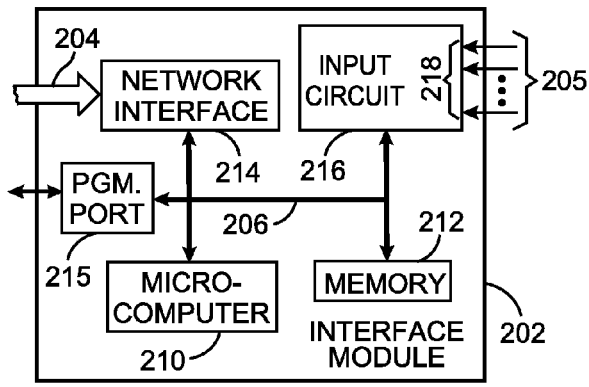
FIG. 6
| INPUT 1 | TRACTION SENSOR |
| INPUT 2 | LIFT SENSOR |
| INPUT 3 | RUN SWITCH |
| INPUT 4 | DEADMAN SWITCH |
| INPUT 5 | WEIGHT SENSOR |
| ... | |
| INPUT N | |
FIG. 7
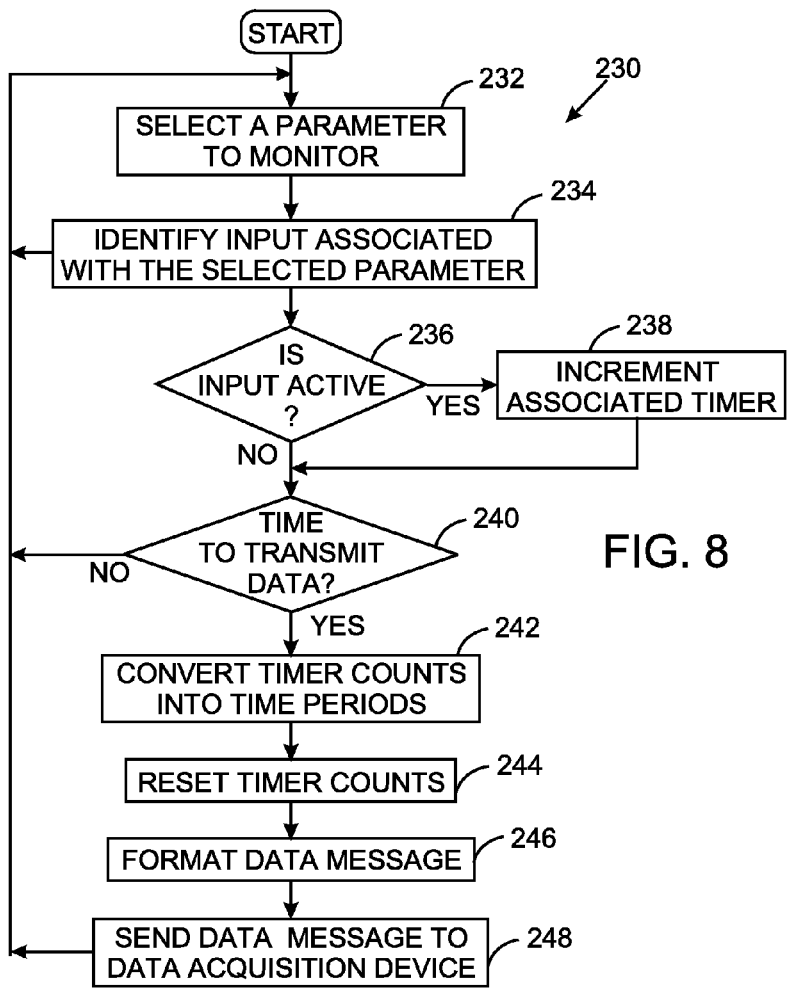
FIG. 8

SYSTEM FOR GATHERING DATA FROM AN INDUSTRIAL VEHICLE

CROSS-REFERENCE TO RELATED APPLICATION

This application is a divisional of co-pending U.S. application Ser. No. 13/524,610 filed on Jun. 15, 2012, the entire contents of which is incorporated herein by reference.

STATEMENT CONCERNING FEDERALLY SPONSORED RESEARCH OR DEVELOPMENT

Not applicable.

BACKGROUND OF THE INVENTION

1. Field of the Invention

The present invention relates to industrial vehicles, such as lift trucks; and more particularly monitoring and managing the operation of the industrial vehicles.

2. Description of the Related Art

Material handling vehicles are powered vehicles commonly used in a facility, such as warehouse, a factory or a store, to transport materials and finished goods. A human operator either sits on a seat or stands on a platform of the vehicle and manipulates controls which govern movement through the facility and operation of a load carrier on which items being transported are placed. Examples of material handling vehicles include, but are not limited to, fork lift trucks, order pickers, stand-up counterbalanced lift trucks, sit-down counterbalanced lift trucks, lift trucks and tow tractors.

Another type of industrial vehicle, known as an autonomously guided vehicle (AGV), is a form of mobile robot that transports goods and materials from one place to another in a constrained environment, such as a factory or a warehouse. Some AGV's followed a wire buried in the floor and thus were limited to traveling along a fixed path defined by that wire. More sophisticated guidance technology developed so that the vehicle was not confined to a fixed path.

In warehousing operations, material quantities and inventory turnover rates are increasing rapidly. Therefore, to maintain competitiveness, it is important to have accurate information about inventory, and to ensure that each piece of equipment, and each employee is productive. For a warehouse to compete on the global level, continually improving operator productivity is vital to reducing costs. To meet these ends, facility management systems are frequently employed to control inventory, ensure proper maintenance of equipment, and to monitor operator efficiency. In these facility management systems, a centralized computer system is used to monitor inventory flow, maintenance status of fleets of industrial vehicles, and operator performance parameters.

To gather data for the monitoring functions, sensors connected by a wiring harness to a data collection computer are frequently added to a material handling vehicle after manufacture. Running the wiring harness throughout the vehicle is time consuming and expensive because of the number of connection points. It is desirable to provide an alternative technique that enables communication between the sensors and either the standard controller already onboard the material handling vehicle or a new dedicated data collection computer. Other techniques to simplify retrofitting sensors and control systems to material handling vehicles also are desired.

It is advantageous that the performance data regarding the material handling vehicles and their operators be transferred to central computer system in the facility. This permits the performance information to be analyzed and compared with similar data from other vehicles and operators. Such analysis is used to determine when a particular vehicle requires maintenance and whether a greater or lesser number of vehicles is required for optimal operating efficiency of the warehouse or factory.

Previously, each material handling vehicle included a wireless transceiver for exchanging data and commands with the facility management system. That system had a local area communication network connected to a plurality of wireless transceivers located throughout the facility. The network transceivers were located so that no matter where a material handling vehicle traveled, it always was within communication range of a network transceiver. Such a local area communication network was relatively expensive and sometimes too costly for small facilities or those with only a few vehicles.

Only persons who have received training are allowed to operate the material handling vehicles. Further the operation of different types of such vehicles requires separate training. Therefore, only those persons trained to operate a particular type of material handling vehicle are permitted to do so. Although a person may have received basic training for a material handling vehicle, his or her operation may be limited until a level of experience has been acquired. For example, until a person has operated a vehicle for a specified number of hours the speed at which his/her vehicle may travel or certain other function may be limited. It is desirable to provide a mechanism that prevents unauthorized persons from operating these vehicles.

SUMMARY OF THE INVENTION

An industrial vehicle transports products and materials in a facility, such as a factory, a warehouse or a store. The vehicle has a controller which receives control signals from operator input devices and, in response, directs operation of various components, such as those that propel the industrial vehicle and that raise and lower the items being transported. Sensors gather data about the operation of those components and other functions of the vehicle. A communication network conveys data and commands among the operator input devices, the controller, the sensors, and other vehicle components.

Operation of the industrial vehicle is managed by devices onboard the vehicle and also by equipment located in the facility in which the vehicle operates.

One such management device is a portable storage device, such as a USB flash drive, for example, that is issued to a person who is authorized to operate the industrial vehicle. The portable storage device can be plugged into a port on the industrial vehicle, which thereby enables the control system to electronically read data from the portable storage device. The data indicates that the person is authorized to operate the industrial vehicle. For example, the data may comprise a unique identifier assigned to the person, such as an employee number, or may identify types of industrial vehicles that the person is permitted to operate. The controller on the vehicle inspects that data read from the portable storage device and determines whether the person is authorized to operate that particular vehicle. If so, the controller enables vehicle operation. The data stored in the portable storage device may also indicate that the person is restricted from operating designated functions on the vehicle or that certain functions may be operated but in a limited manner. The industrial vehicle also may be permitted to store performance data in the portable storage device.

Another management device comprises an apparatus for transmitting data, such as the sensor data, through a power line that carries electricity for powering components on the industrial vehicle. An electrical choke, such as a ferrite bead, for example, has a conductor passing there through, wherein the conductor connects a first component to the power line. A first communication circuit is provided for least one of sending and receiving message signals and has a transmission wire for carrying the message signals. The transmission wire passes through the electrical choke and is electrically coupled to the conductor at a point between the first electrical choke and the first component.

In one aspect of this management device the transmission wire passes through the first electrical choke in a first direction going from the first communication circuit to the conductor. The conductor then passes through the first electrical choke in a second direction going from the first component to the power line, wherein the second direction is opposite to the first direction.

A first communication circuit is connected to a first component and is operatively connected for at least one of sending and receiving a data signal through the power line. A wire bead of magnetically permeable material has a conductor that passing there through in a first direction from the power line to a second component. A second communication circuit is provided for at least one of sending and receiving the data signal and has a transmission wire for carrying the data signal. The transmission wire passes through the wire bead in a second direction from the second communication circuit to the second component, wherein the first direction is opposite to the second direction. The transmission wire is connected to the conductor adjacent the second component.

A further management device includes an apparatus for acquiring performance data from the industrial vehicle. That apparatus has a data acquisition module with a network port which is adapted to connect to a communication network on some industrial vehicles to receive data, and has a device for wirelessly transmitting the data. Nevertheless, the data acquisition module is incompatible for connection via the network port to the communication network on certain industrial vehicles. In that instance, the apparatus includes an interface module which has an input adapted to receive a signal from a component on the industrial vehicle. The interface module derives data from the signal, and has a network interface for connection to the network port to convey the data to the data acquisition module. The interface module translates the signal from the vehicle component into a format for transmission to the network port of the data acquisition module.

The interface module may have a plurality of inputs for receiving signals from a plurality of components on the industrial vehicle. In that embodiment, the interface module has a storage device containing an input mapping table that designates a relationship between each of the plurality of inputs and each of the plurality of components. The table is used during input signal processing to send data, derived from the input signals, to the data acquisition module in a format that enables the data acquisition module to identify the vehicle component to which the data relates.

BRIEF DESCRIPTION OF THE DRAWINGS

FIG. 6 is a block diagram of the circuitry for an interface module of the data acquisition and communication equipment in FIG. 5;

FIG. 7 depicts a signal input mapping table stored in the interface module; and FIG. 8 is a flowchart of software executed by the interface module.

DETAILED DESCRIPTION OF THE PREFERRED EMBODIMENT

The present invention relates to the operation of an industrial vehicle. Although the invention is being described in the context of a stand-up, counterbalanced lift truck used at a warehouse, the inventive concepts are applicable to other types of industrial vehicles and their use in a variety of other facilities, such as factories, freight transfer stations and stores, for example.

Figure 1:
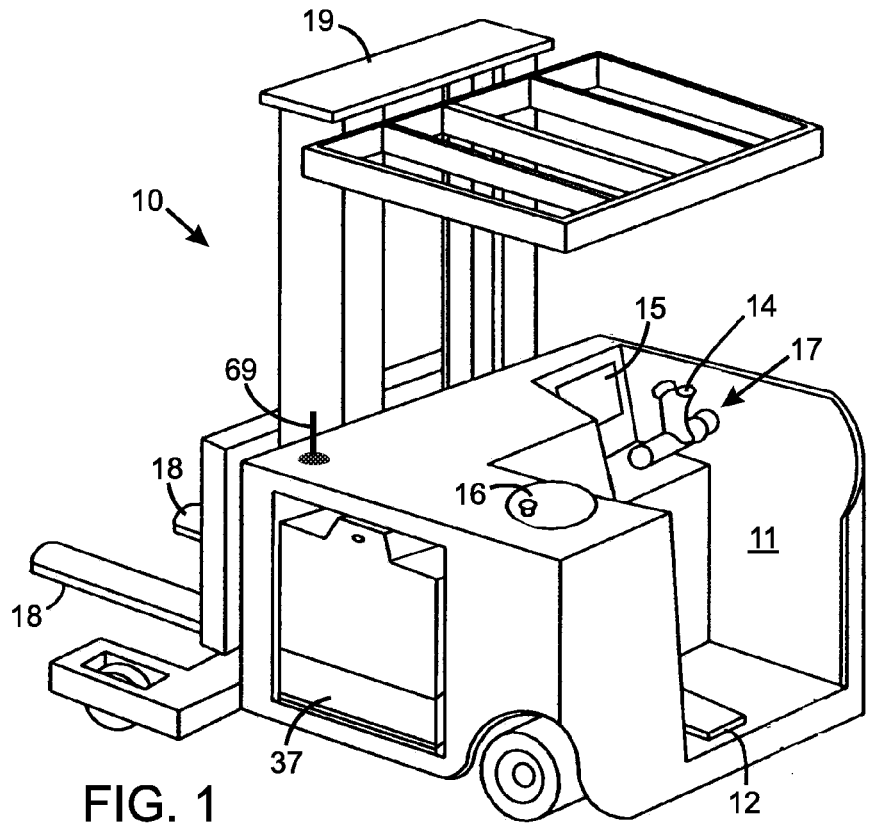
FIG. 1 is a perspective view of an industrial vehicle that incorporates an apparatus according to the present invention.

With initial reference to FIG. 1, an industrial vehicle 10, specifically a lift truck, includes an operator compartment 11 with an opening for entry and exit by the operator. Associated with the operator compartment 11 are a key-operated run switch 13, a deadman switch 12, control handle 14, and steering wheel 16 that collectively serve as operator controls 17. A information pertaining to the vehicle operation is presented to the operator in a display 15. The industrial vehicle 10 has a load carrier 18, such as a pair of forks, that is raised and lowered on a mast 19. As will be described in further detail, a communication system on the industrial vehicle is able to exchange data and commands via an antenna 69 and a wireless signal with an external warehousing system.

Figure 2:
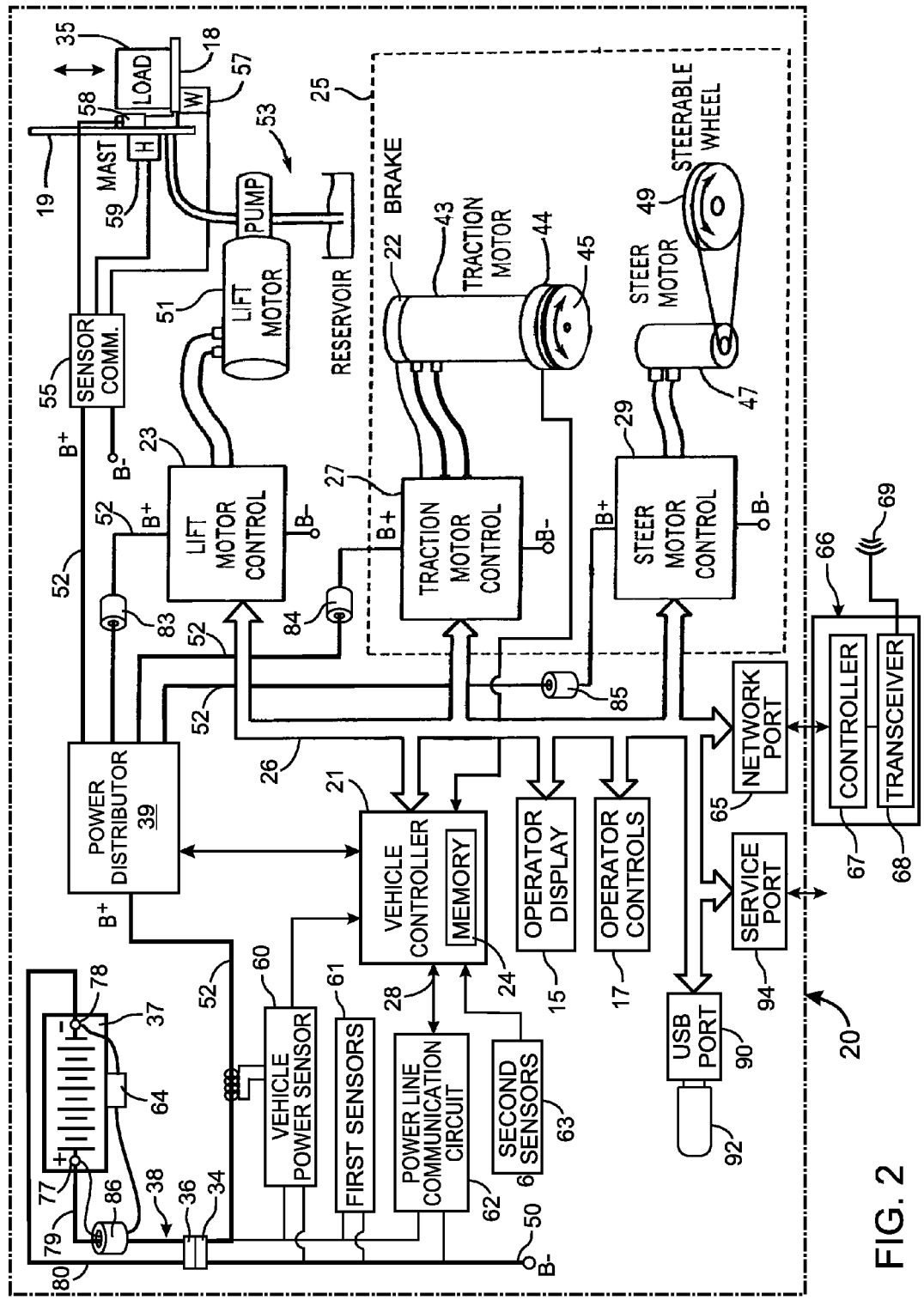
FIG. 2 is a block diagram of the control system of the industrial vehicle.

With reference to FIG. 2, the industrial vehicle 10 is powered by a multiple cell battery 37 that is electrically coupled to the vehicle by a cable 38 that has two conductors 79 and 80. One end of the cable 38 is attached to the battery terminals and the other end has a battery connector 36 that mates with a power connector 34 on the industrial vehicle 10. The battery connector 36 enables the battery 37 to be removed from the vehicle and plugged into recharging equipment, as will be described. The positive conductor 79 (B+) of the battery cable 38 is connected to a bank of fuses or circuit breakers in a power distributor 39 through which electricity is supplied to other components via a set of conductors, collectively referred to as the power line 52 of the vehicle. The negative conductor 80 (B−) of the battery cable 38 is connected to another negative conductor 50 that extends throughout the industrial vehicle 10 and is connected to the various electrical components.

The industrial vehicle 10 has a control system 20 built around a vehicle controller 21 which is a microcomputer based device that includes a memory device 24, analog to digital converters, and input/output circuits. A communication network 26 links the vehicle controller 21 to other components for different functions performed by the industrial vehicle 10. The communication network 26 may be any of several types of well-known networks for exchanging commands and data among components of a machine, such as for example, the Controller Area Network (CAN) serial bus that employs the communication protocol defined by ISO-11898 promulgated by the International Organization for Standardization in Geneva, Switzerland. As will be elaborated upon, the vehicle controller 21 also is coupled to a power line communication circuit 62 for exchanging data through the vehicle power line with other components.

The operator display 15 is coupled to the communication network 26 to receive information from the vehicle controller 21 and present that information to the vehicle operator. The operator display 15 indicates vehicle operating parameters, such as for example, the speed of travel, battery charge level, hours of operation, time of day, the temperatures of selected components, and the like. Other kinds of information such as when vehicle maintenance needs to be performed and alert annunciations also are presented on the operator display 15 to notify the operator of conditions requiring attention.

The operator controls 17 are connected by interface circuits to the communication network 26 to send input control signals to the vehicle controller 21 to govern operation of vehicle functions, such as forward and backward travel, steering, braking, and raising and lowering the load carrier 18. The vehicle controller 21 responds to some of those input control signals by sending messages, containing operating commands, via the communication network 26 to a lift motor control 23 and a propulsion drive system 25. The propulsion drive system 25, which comprises a traction motor control 27 and a steer motor control 29, provides a motive force for moving the industrial vehicle 10 in a designated travel direction, while the lift motor control 23 drives load carrier 18 along a mast 19 to raise or lower a load 35, such goods being warehoused.

The traction motor control 27 drives one or more traction motors 43 which is connected to a propulsion wheel 45 to provide motive force to the industrial vehicle. The speed and rotational direction of the traction motor 43 and the associated propulsion wheel are designated by the operator via the operator control handle 14, and are monitored and controlled through feedback signals derived from a rotation sensor 44. The rotation sensor 44 can be an encoder coupled to the traction motor 43 and the signal therefrom is used to measure the acceleration, speed and distance that the vehicle travels in the facility. The propulsion wheel 45 also is connected to a friction brake 22 through the traction motor 43, to provide both service and parking brake functions for the industrial vehicle 10.

The steer motor control 29 is connected to drive a steer motor 47 and associated steerable wheel 49 in a direction selected by the operator by rotating the steering wheel 16, described above. The direction of rotation of the steerable wheel 49 determines the direction that the industrial vehicle 10 turns during travel through the facility.

The lift motor control 23 sends command signals to control a lift motor 51 which is connected to a hydraulic circuit 53 that forms a lift assembly for raising and lowering the load carrier 18 along the mast 19. In some applications, the mast 19 can be a telescoping structure, in which case the hydraulic circuit also raises and lowers the mast. As shown here, a height sensor 59 provides a signal to the vehicle controller 21 indicating the height of the load carrier on the mast 19. Similarly, a weight sensor 57 is provided on the load carrier 18. A load presence sensor 58, such as a radio frequency identification (RFID) tag reader or a bar code reader, for example, is mounted on the mast to identify the goods being transported.

The signals from the weight sensor 57, load presence sensor 58, and height sensor 59 are applied to a sensor communication circuit 55 that sends the sensor data through the power line 52 of the industrial vehicle. The sensor communication circuit 55 enables messages containing data and commands to be exchanged bidirectionally with the vehicle controller 21 and is a conventional device for transmitting and receiving digital signals through conductors that carry electrical power to devices. Periodically the sensor communication circuit 55 reads the signals from the weight sensor 57 and height sensor 59. When the load presence sensor 58 detects information from a load 35, such as data read from an RFID tag, that data are sent to the sensor communication circuit 55. The sensor communication circuit 55 places the acquired data in a message frame that is defined by a protocol for communication through the vehicle power line 52. That message frame is addressed to the vehicle controller 21. Then the sensor communication circuit 55 uses the message frame to modulate an oscillating carrier signal which is sent through the vehicle power line 52. In another technique, the digital data are transmitted serially as pulses of a high frequency signal. Alternatively, each of the sensors 57-59 may have its own internal communication circuit for exchanging data via the vehicle power line 52.

Referring still to FIG. 2, the vehicle control system 20 includes a first group of sensors 61 that have internal communication circuits for exchanging data via the vehicle power line 52. For example, these may be impact sensors mounted at various locations to detect when the industrial vehicle impacts another object. Because these sensors use the power line 52 for communication, they can be installed easily after the industrial vehicle has been manufactured because only a power line connection is needed and not a connection to the communication network 26 or other signal lines. This can significantly reduce the wiring work required to add the sensors throughout the vehicle.

Another second group of sensors 63, that are installed by the manufacturer, interface directly with the vehicle controller 21 for the transfer of data and do not use the power line communication technique.

Figure 4:
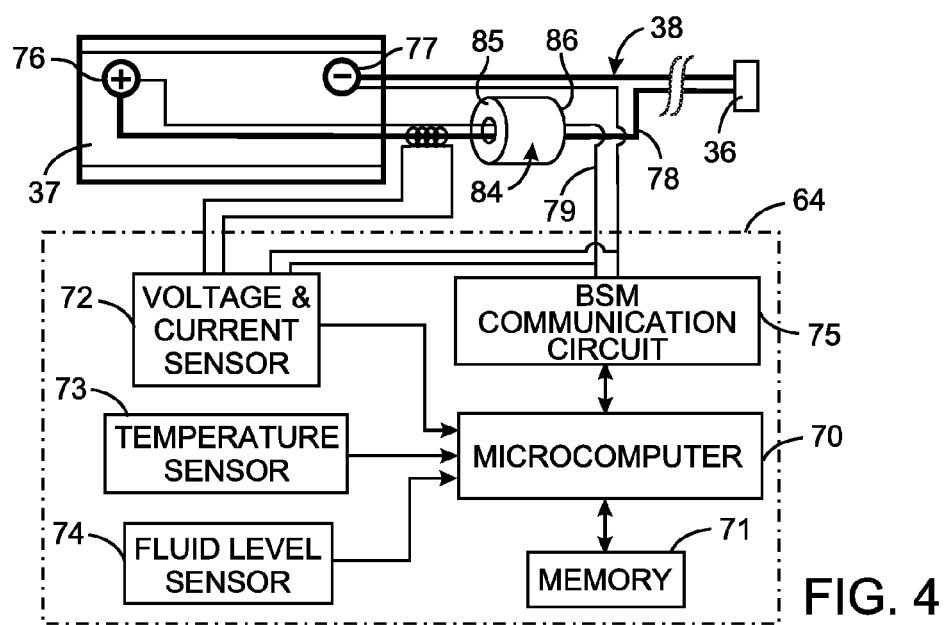
FIG. 4 is a block diagram of the battery status monitor that is mounted on a battery of an industrial vehicle.

A battery status monitor 64 is mounted on the battery 37 and gathers and stores data regarding the battery's performance while the battery is powering the industrial vehicle 10 and while the battery is being recharged at a charging station. The battery status monitor 64 may be built into the battery or may be removably attached thereto. With reference to FIG. 4, the battery status monitor (BSM) 64 comprises a microcomputer 70 that includes a digital processor, input/output circuits, and analog to digital converters. The microcomputer 70 is connected to a memory device 71 that stores a software program, which is executed by the microcomputer to govern the operation of the battery status monitor 64. In addition, data that is used or produced by that software program are stored within the memory device 71. For example, the memory device 71 has a data table containing manufacturer specification data related to the battery 37, such as a unique serial number, weight, the battery's nominal voltage, and its rated capacity in terms of ampere hours or kilowatt-hours.

The battery status monitor 64 has several sensors located on the battery 37. A voltage sensor 72 measures the voltage across the positive and negative terminals 77 and 78, respectively, of the battery. Alternatively, voltage may be detected in each individual cell of the battery 37. A current sensor 73 detects a level of electric current flowing in either direction through one conductor of the battery cable 38 and thus the senses the current used to power the industrial vehicle 10, as well as the current that recharges the battery. A temperature sensor 74 measures the internal temperature of the battery 37 and a fluid level sensor 75 detects the battery's electrolyte level. Periodically, the microcomputer 70 in the BSM 64 reads the signals produced by the battery sensors 72-75 and stores the measurement data in another data table within memory 71. Each time the battery is recharged, the microcomputer 70 increments a count of those events that is stored in the memory device 71.

Periodically the microcomputer 70 reads the previously stored data from the memory device 71 and sends that data to a BSM communication circuit 76. The BSM communication circuit 76 enables the microcomputer 70 to exchange messages bidirectionally with the vehicle controller 21 via the power line 52 of the industrial vehicle 10 in the same manner as described preciously in respect of the sensor communication circuit 55.

Referring again to FIG. 2, the messages sent through the power line 52 by the BSM communication circuit 76 and the sensor communication circuit 55 are received by a power line communication circuit 62 that is electrically attached to the B+ conductor 50 of the vehicle's power connector 34 that mates with the battery cable connector 36. The sensor data received from those other communication circuits 55 and 76, are forwarded to an input/output port 28 of the vehicle controller 21 for storage in a memory device 24, from which the sensor data are subsequently read and processed in a conventional manner by the control software executed by the vehicle controller. In addition to receiving message from other communication devices, the power line communication circuit 62 is able to transmit messages containing data and commands that are addressed to those other communication devices. Such messages are transmitted through the power line 52 using the same power line communication protocol as described previously.

A problem encountered when sending messages through the power line 52 (e.g., the positive B+ conductors) of an industrial vehicle is that many electrical components provide a shunt path to the negative (B−) conductor, which path undesirably attenuates the communication signal. Such components include the battery, electronic circuit power supplies, power amplifier capacitor banks, and electric motors. Those components tend to act as a short circuit to the communication signal, so a large portion of that signal is drained through the components and does not travel throughout the electrical system to other components that are intended to receive the communication signal.

The signal losses due to vehicle components providing a shunt path can be mitigated by isolating those components from the section of the power line 52 through which the communication messages need to travel. Such isolation is achieved by placing an electrical choke in series with components that need to be isolated. As shown in FIG. 2, electrical chokes, in the form of wire beads 83, 84 and 85, are placed in the connections of the lift motor control 23, traction motor control 27, and steer motor control 29 to the power distributor 39. These wire beads 83-85 reduce the amount of attenuation of the communication signals caused by the motor controls. Other types of electrical chokes may be used to implement the present invention.

A wire bead, also called a ferrite bead, is a passive device that suppresses high frequency signals in a wire which passes through the device. In this application, each wire bead is cylindrical tube made a high magnetically permeable material, such as iron oxide, that is compressed under extreme pressure. An alternating electrical current flowing in the wire produces a surrounding magnetic field. The wire bead increases the magnetic flux density for a given field strength and therefore increases the inductance of the wire to alternating current signals. Thus the wire bead does not affect the flow of direct current from the battery to components of the control system 20.

The use of a wire bead to isolate the battery 37 is more complicated, because the battery status monitor (BSM) 64 is connected directly to the battery terminals in order to measure the battery voltage as accurately as possible. This makes it undesirable to put the ferrite bead on just the battery cable 38 (across both the positive and negative conductors 79 and 80), as doing so will attenuate the message signals from the BSM communication circuit 76.

The solution is shown in FIG. 4, in which a message transmission wire 82 from the battery status monitor 64 passes through a wire bead 86 in a first direction (e.g., into the first end 87 of the wire bead and out the second end 88) going from the BSM communication circuit 76 to the battery 37. The positive (B+) conductor 79 of the battery cable 38 passes through the wire bead 86 in an opposite second direction (e.g., into the second end 88 and out the first end 87) going from the battery 37 to the battery connector 36. With respect to the transmission of BSM message signals, the message transmission wire 82 and the battery's positive conductor 79 can be thought of as a single signal conductor 40 that passes from the battery status monitor 64 through the wire bead 86 and then loops back through the wire bead again before reaching the battery connector 36.

When the BSM communication circuit 76 transmits a message, the first time that the signal conductor 40 passes through the wire bead 86 in the first direction, the message's high frequency data signal induces magnetic flux in the wire bead. Thus the wire bead 86 presents a high impedance, which essentially blocks the data signal from reaching the battery 37 and its low impedance path to ground. The second time the signal conductor 40 passes through the wire bead 86 in the second direction, the previously generated magnetic flux in the wire bead 86 induces the high frequency data signal into the positive conductor 79 of the battery cable, sending the BSM message toward the battery connector 36.

The same effect occurs with respect to message signals traveling from the vehicle controller 21 to the battery status monitor (BSM) 64. This effect, therefore, enhances power line communication.

Returning to FIG. 2, the control system 20 further includes a USB port 90 connected to the communication network 26 in order to communicate with the vehicle controller 21. The USB port 90 enables a data storage device, specifically a flash drive 92, to be removably connected to the vehicle control system 20. That device connection enables vehicle controller 21 to read data from and store data to the flash drive 92. As used herein with respect to the flash drive 92, "removably" means that the flash drive can be disconnected from the USB port 90, by a user merely pulling the drive from the port by hand without dismantling any part of the control system 20 or of the industrial vehicle and without using any tool.

A unique function of the USB flash drive 92 is that of a key that enables operation of the industrial vehicle 10. Previous vehicles required a key to operate a switch that activated the industrial vehicle. In the present system, each person who is authorized to operate an industrial vehicle is issued a USB flash drive in which is stored a unique identifier of that person, such as an employee number. The data stored in the USB flash drive 92 may also identify different types of industrial vehicles 10 that the person is authorized to operate. When operation of a particular vehicle is desired, the person plugs his/her USB flash drive 92 into the USB port 90 on the vehicle. The port detects the connection to a flash drive and sends a message informing the vehicle controller 21 of that event. In response, the vehicle controller 21 reads the person identifier and, if provided, the list of authorized industrial vehicle types from the USB flash drive 92. If one of the authorized industrial vehicle types corresponds to the type of the present industrial vehicle, then operation of that vehicle is enabled. Alternatively, the vehicle controller 21 may compare the person identifier read from the flash drive to a list of authorized persons stored in the memory device 24 of the vehicle controller. If a match is found then operation of the present industrial vehicle is enabled.

The flash drive 92 may contain other information about the particular person to whom the flash drive is issued. For example, operation of an industrial vehicle by a relatively inexperienced operator may be limited until that person acquires a certain level of experience, e.g., has operated that type of vehicle for a predefined number of hours. In this instance, the information in the flash drive designates an operation level for the person as being an inexperienced operator. Upon reading that indication at vehicle start-up, the vehicle controller 21 restricts or limits the operating parameters for certain vehicle functions, such as limiting the travel speed to a rate that is less than the maximum possible speed, limiting the vehicle acceleration rate to less than a maximum possible magnitude, and limiting an acceleration rate of the load carrier 18 on the mast 19 to less than a maximum possible magnitude. As used herein such limiting allows the person to drive the vehicle and raise and lower the load carrier, just that the operations are restricted as compared to other persons operating the same industrial vehicle. For example, with an inexperienced person in control, the industrial vehicle is able to travel around the warehouse, however, the maximum speed allowed by the vehicle controller 21 is set to a threshold that is less than the maximum speed at which the vehicle can otherwise travel.

The vehicle controller 21 also is capable of storing data into the flash drive 92. For example, the vehicle controller 21 measures the time that the particular person is operating the industrial vehicle and adds that time to a cumulative amount of operating time for that type of industrial vehicle stored in the flash drive 92. This process enables the experience level of the particular person to be determined from that cumulative amount of operating time.

The flash drive 92 also can be used to store other kinds of information and performance data regarding each industrial vehicle 10 operated by the person to whom the flash drive was issued. Each industrial vehicle 10 has a unique identifier, such as its manufacturer's serial number, which is transferred into the flash drive 92 along with the vehicle operational data produced by the control system 20. Such operational data includes the number of hours in operation, battery state of charge, fault codes generated, aggregate time that the lift motor was active, and speed and acceleration of the vehicle and of the load carrier 18.

Occasionally the a vehicle operator plugs his/her USB flash drive 92 into a port on the computer of the warehouse management system and transfer the stored operational data into that computer. Commerically available software, such as the iWarehouse® program from The Raymond Corporation of Greene, N.Y., U.S.A., is executed by the warehouse management system computer to analyze the transferred data to evaluate the performance of each vehicle operated by the person and of that person.

With continuing reference to FIG. 2, the vehicle control system 20 also has a service port 94 that enables external equipment to exchange messages over the communication network 26 with various components on the industrial vehicle 10. For example, maintenance technicians are able to connect a laptop computer (not shown) to the control system to read conventional fault codes generated by the vehicle controller 21 which indicate particular problems that the vehicle encountered, as is conventional practice. The laptop computer also can read other types of vehicle data that is stored in the memory device 24 of the vehicle controller 21.

The communication network port 65 also enables an aftermarket data acquisition device 66 to be connected to the vehicle's communication network 26. Through that connection the data acquisition device 66 acquires the performance data which is stored in the memory device 24 of the vehicle controller 21. Specifically the data acquisition device can send the vehicle controller 21 messages requesting such data and then receive other messages carrying that requested data from the vehicle controller.

The data acquisition device 66 has a controller 67 which performs the function of acquiring the data from the vehicle controller 21 and has a wireless transceiver 68 that has an antenna 69 for bidirectional exchange of data and commands with a communication system in the warehouse or factory in which the industrial vehicle 10 operates. Preferably the transceiver 68 uses radio frequencies, although optical, ultrasonic or other wireless communication technology can be employed and any one of several standard communication protocols, such as Wi-Fi, can be used to exchange messages and data. Each industrial vehicle 10 has a unique identifier, such as its serial number, that enables messages to be communicated specifically to that vehicle. The unique identifier usually is included in every message sent to and from the industrial vehicle 10, however some messages are broadcast to all the industrial vehicles in the warehouse by using a broadcast identifier to which all vehicles respond.

Figure 3:
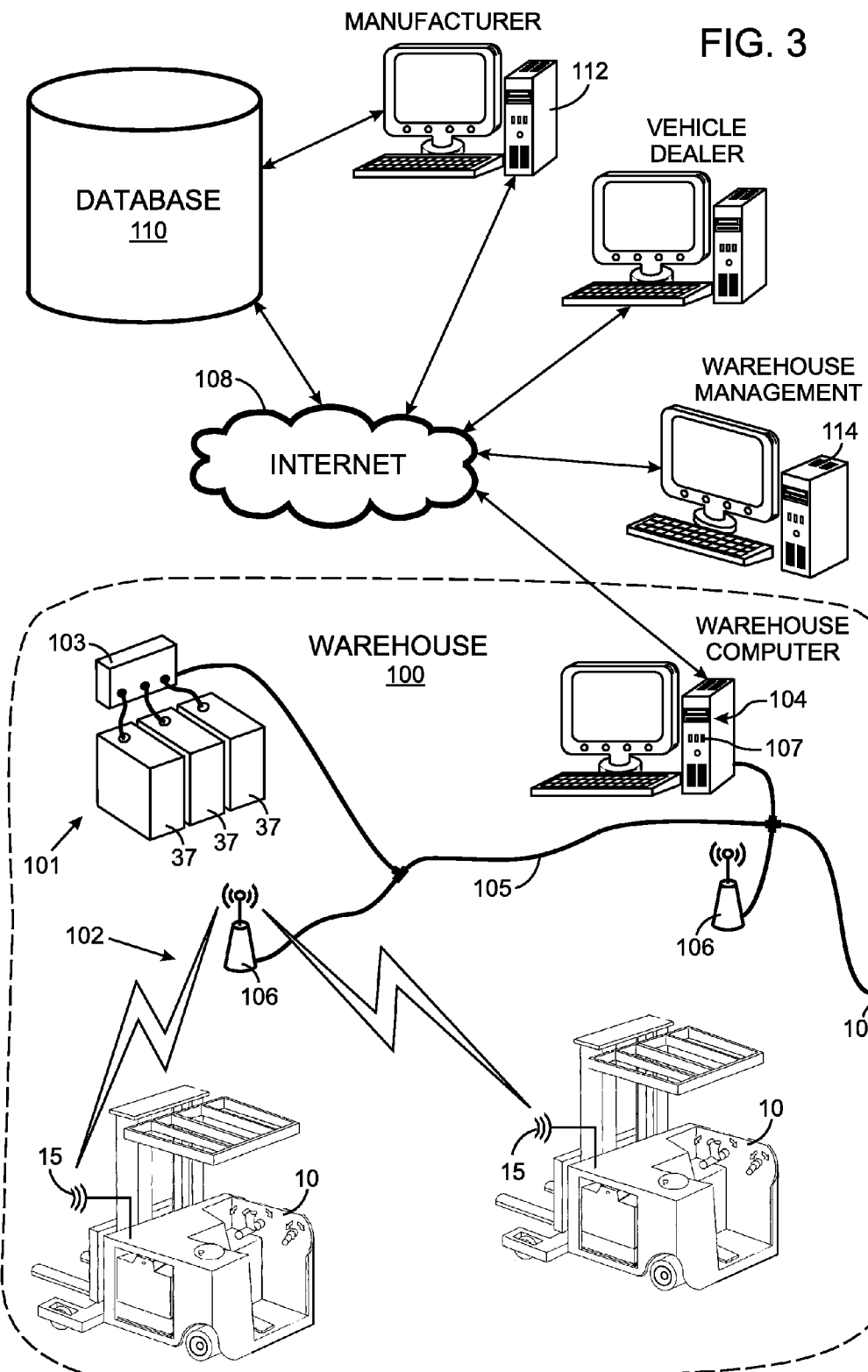
FIG. 3 depicts an exemplary vehicle fleet management system in which industrial vehicles communicate via a network with a central computer in a warehouse that is linked to a remote database to which other computers have access.

Referring now to FIG. 3, a warehouse 100, in which one or more industrial vehicles 10 operate, includes a communication system 102 that links the vehicles to a warehouse computer 104. The communication system 102 comprises a plurality of wireless transceivers 106, for example radio frequency devices, distributed throughout the warehouse 100, such as in the shipping dock and goods storage areas. The wireless transceivers 106 are connected via a conventional local area network 105 or a TCP/IP communications link to the warehouse computer 104. Alternatively the wireless transceivers 106 can be coupled wirelessly, such as through a Wi-Fi link, to the warehouse computer 104. The warehouse 100 has one or more battery charging stations 101 where the batteries 37 are removed from the industrial vehicles 10 and recharged by equipment 103. The charging equipment 103 also is connected to the local area network 105 for exchanging data with the warehouse computer 104. The warehouse communication system 102 enables the performance data from the fleet of industrial vehicles 10 to be automatically transferred at regular intervals to the warehouse computer 104, instead of manually using the USB flash drives 92 as previously described. The USB flash drives 92, when used, are plugged into a port 107 on the warehouse computer 104.

The warehouse computer 104 is connected to the Internet 108, thereby enabling communication with a computer system 114 at the headquarters of the warehouse company. That connection allows the headquarters computer system 114 to receive data regarding the operation of the fleet of industrial vehicle at all the warehouses in the company. Both warehouse computer 104 and the headquarters computer system 114 execute software for storing, analyzing and reporting the operating information for the industrial vehicles.

The connection of the warehouse computer 104 to the Internet 108, or other external communication network, permits the warehouse computer to access a vehicle specific data that stores vehicle specific data provided by the vehicle manufacturer. The vehicle specific data is transferred into the vehicle specific data from a manufacturer computer 112. The data gathered from the industrial vehicles at the warehouses also is uploaded and stored in the database 110. Selected data can also be accessed by, for example, warehouse management personnel or vehicle dealers, who can connect to the database 110 through the Internet 108. The various computers can analyze and compare the data gathered from all the industrial vehicles at a given warehouse, at all the facilities of the warehouse company, or all the vehicles made by the same manufacturer.

The data acquisition device 66 in FIG. 2 is custom designed for use with a particular industrial vehicle 10. The controller 67 of the data acquisition device 66 is specifically configured to communicate over the vehicle's communication network 26 with the vehicle controller 21 and other components. Thus, a manufacturer of an aftermarket data acquisition device has to be privy to details of the operation of the particular vehicle's control system 20 and the communication protocol used on the vehicle network 26. Such intimate knowledge of the details for a particular industrial vehicle are not always available to other manufacturers of aftermarket equipment. In other situations, even if the data acquisition device is specifically designed for operation with a particular brand of industrial vehicle, vehicles produced by different manufacturers may operate in the same warehouse and it is therefore desirable that data from all those vehicles be communicated to the warehouse computer 104 via the warehouse communication system 102. As a consequence, it is desirable to be able to retrofit a data acquisition device 66 that was developed for one particular brand of industrial vehicles onto similar vehicles from other manufacturers.

Figure 5:
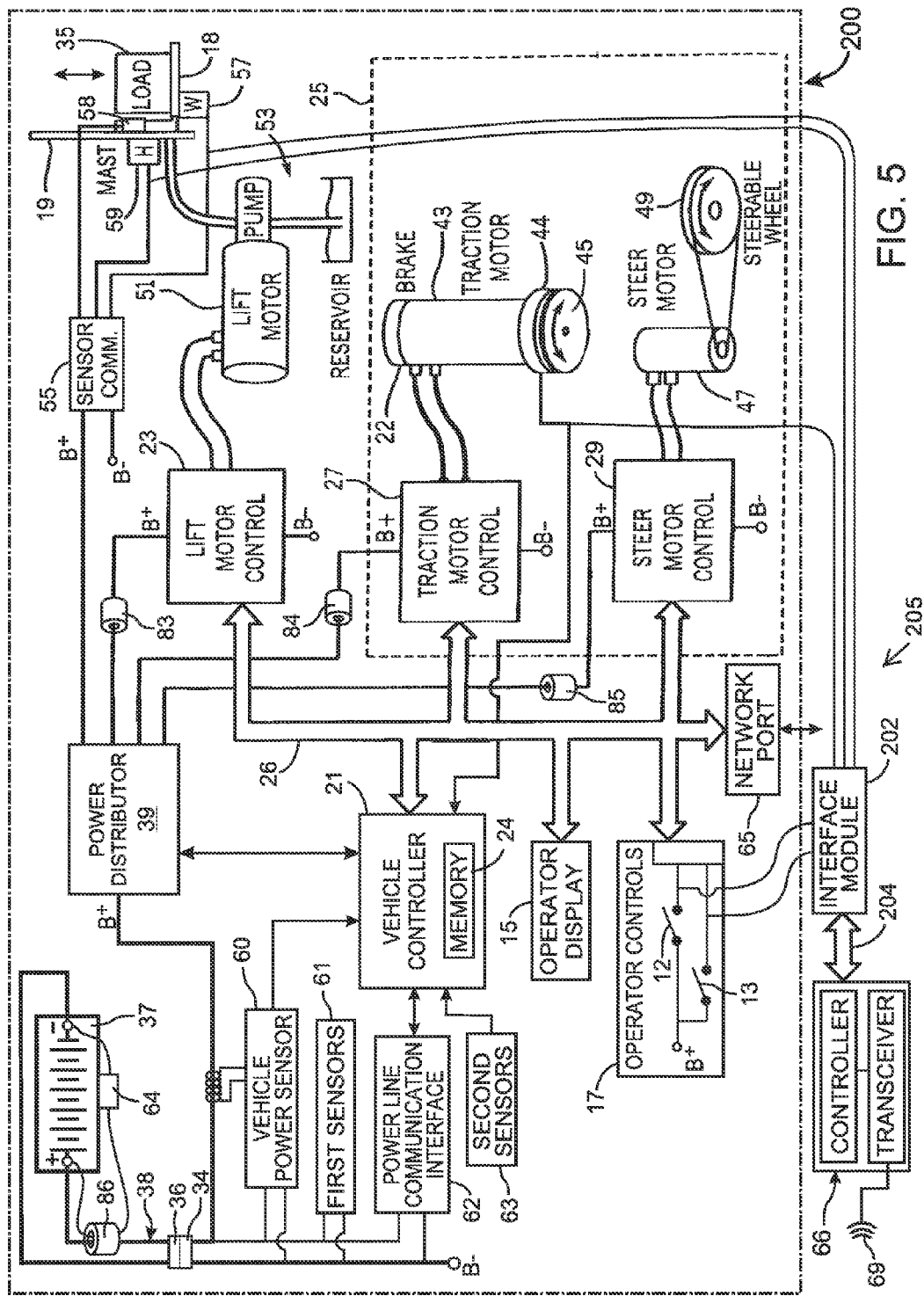
FIG. 5 is a block diagram of another control system of the industrial vehicle to which data acquisition and communication equipment has been retrofitted.

The adaptation of a particular data acquisition device 66 for use on other types of industrial vehicles is shown in FIG. 5. The second control system 200 for this industrial vehicle is generally similar to the first control system 20 in FIG. 2 that was previously described. The components of control system 200 that are identical to those in the first control system 20 have been assigned the same reference numerals. It should be understood, however, that the format of the data produced by the vehicle controller 21 and the protocol used on the communication network 26 of the second control system 200 are not compatible with the data acquisition device 66. Although the data acquisition device 66 has an input for a communication network, that input was designed for connection to a different vehicle network. Nevertheless, the data acquisition device 66 is designed to formulate data packets for transmission as messages to the warehouse communication system 102 (FIG. 3) in which the particular industrial vehicle operates.

Because of that vehicle interface incompatibility, the data acquisition device 66 is coupled to the vehicle control system 200 by an interface module 202. The interface module is connected by a communication link 204 to the existing vehicle network port on the data acquisition device 66. Thus data is sent from the interface module 202 to the data acquisition device 66 in messages using the same protocol as though the data acquisition device is connected to the vehicle communication network 26 in the first control system 20.

The interface module 202 has a plurality of sensor inputs that are connected by a plurality of wires 205 to the output signal conductors of various sensors and devices in the control system 200. For example, an input wire is connected to the output of the height sensor 59 that is connected to the mast 19 of the industrial vehicle to provide a signal indicating the height of the load carrier 18. This signal provides an input to the interface module 202 that indicates when the load carrier is raised, as occurs when carrying a load. Alternatively, if the control system 200 does not have a height sensor, a simple switch can be added that indicates when the load carrier 18 is not at the fully lowered position. Another one of the wires 205 is connected to the output of the weight sensor 57 which thereby provides a signal indicating the weight of a load 35 when present on the carrier 18. A further signal wire 205 is connected to the output of the rotation sensor 44 to receive a signal indicating when the traction motor 43 is operating and thus when the vehicle is traveling. Alternatively, a hall effect sensor or other device could be placed near one of the power conductors extending between the traction motor control 27 and the traction motor 43 to sense when current is flowing through that conductor and thus when the motor is operating. In the second control system 200, the operator controls 17 include a key-operated run switch 13 that is used to turn on the industrial vehicle, and a deadman switch 12 which must be depressed by the foot of the operator in order to operate vehicle functions. Thus when a key-operated run switch 13 is in the ON position and the industrial vehicle 10 is running, but no one is in the operator compartment 11 (FIG. 1), the deadman switch 12 supplies a signal indicative of that event. Additional wires 205 extend from the deadman switch 12 and the key-operated run switch 13 to inputs of the interface module 202.

With additional reference to FIG. 6, the input wires 205 lead to terminals of an input circuit 216 in the interface module 202. The input circuit 216 is connected by a communication bus 206 to a microcomputer 210 which executes a software program that governs the data transfer function performed by the interface module. A memory device 212, also connected to the communication bus 206, stores the software program and data processed by that program. A network interface circuit 214 connects the internal communication bus 206 to the communication link 204 that leads to the data acquisition device 66.

Different industrial vehicles, with which the interface module 202 may be used, can have different devices that provide input signals to the module. The input terminals for the input circuit 216 are not predefined to receive signals from specific sensors or for specific vehicle functions. That is, each input can be connected by the user to any of the appropriate components on the industrial vehicle. The interface module 202 contains a table within memory device 212 that provides a map associating each input terminal to a particular vehicle function being monitored. That input mapping table 220 is defined during the initial configuration of the interface module 202 upon installation. At that time, a technician plugs a laptop or other portable computer into the programming (PGM.) port 215 and initiates a configuration routine of the software stored within the interface module. The configuration routine enables the technician to assign each of the inputs 218 of the input circuit 216 to a particular function being monitored. The results of that configuration are stored in the input mapping table 220, an example of which is shown in FIG. 7. The first input terminal (INPUT1) is assigned to receive the signal from the rotation sensor 44 on the traction motor 43, which indicates when that motor is operating and the vehicle is travelling. The second input terminal (INPUT2) is assigned for the wire that extends the height sensor 59 on the mast 19 the signal on which indicates when the load carrier 18 has been lifted from the bottom most position. The third input terminal (INPUT3) of the interface module is designated to receive the signal from the key operated run switch 13 of the control system 200 in FIG. 5. The fourth input terminal (INPUT4) on the exemplary configuration table is connected to the wire from the deadman switch 12 and the fifth input terminal (INPUT5) is assigned for the load weight sensor signal. Additional inputs may be used for other signals derived from the vehicle control system 200 with there being total of N input terminals on the exemplary interface module 202.

Whenever the industrial vehicle is running, power is applied to the interface module which thereby executes a software program stored in the memory device 212. That program periodically inspects the signal at each of input terminal and updates corresponding operational data regarding the performance of the industrial vehicle. For example, the parameters being monitored may include a key hour meter indicating the aggregate amount of time that the key operated run switch 13 is closed and the industrial vehicle is running. A lift hour meter indicates the aggregate amount of time that the load carrier 18 is raised above the bottom most position. A travel hour meter accumulates the total amount of time that the traction motor 42 is active and thus the vehicle is traveling. Finally, in the exemplary system a deadman hour meter tracks the amount of time that the deadman switch 12 is closed as occurs when an operator steps on the pedal of that switch. By subtracting the amount of time indicated by the deadman hour meter from the amount of time indicated by the key hour meter, the amount of time that the operator is out of the operator compartment while the industrial vehicle is running can be calculated.

With reference to FIG. 8, the various hour meters are updated by a software program 230 that is executed continuously or at predefined intervals whenever the industrial vehicle 10 is operating. Although the operation of the software program 230 will be described in the context of hour meters, other operating parameters, such as the cumulative load weight that has been transported, also can be processed by the interface module. When the industrial vehicle initially starts operating, the software program commences execution at step 232 where one of the hour meters is selected. The program includes a table of the different hour meters and execution of the program 230, in a looping manner, sequentially processes the data for each hour meter. After a particular hour meter has been selected, the program execution advances to step 234 where the input mapping table 220, depicted in FIG. 7, is inspected to determine which of the inputs 218 receives the sensor signal for the selected parameter. Next, at step 236, a determination is made whether the signal at the associated input is active. For example, if the parameter is rotation of the traction motor 43 indicating that the vehicle is travelling, a determination is made whether a true logic level signal is being applied to INPUT1. If that is the case, the program execution branches to step 238 where a timer for the particular parameter, i.e., the travel hour meter, is incremented by one. Each timer is in fact a counter that is incremented each time the looping through the software program selects the associated parameter. Because such looping occurs at regular intervals, each increment of the counter corresponds to a time interval at which the selected parameter was active. For example, count of the timer for the travel hour meter indicates the number of such time intervals during which the vehicle travelling. i.e., being propelled on the warehouse floor. after incrementing the travel hour meter counter, the program advances to step 240. If, however, at step 236, the input associated with the selected parameter was not found to be active, the program execution directly advances to step 240 without incrementing the associated timer, as the designated parameter was inactive during the recent time interval. It should be understood that the software program is executed frequently enough so that incrementing the various parameter timers accurately indicates the amount of time that the parameters are active.

When the program execution reaches step 240, a determination is made whether the accumulated parameter data should be transmitted to the data acquisition device 66. That data transmission occurs either a particular time of day as indicated by a real time clock within the interface module 202, the expiration of a given time period such as once every hour, or upon the interface module 202 receiving a request for data from the data acquisition device 66 via the communication link 204. If it is not time to transmit the data, the program execution returns from step 240 to step 232 at which another hour meter is selected and the program execution loops again through steps 232-240 for that new parameter. In this manner, the looping through steps 232-240 sequentially gathers data about the different selected operating parameters of the industrial vehicle.

When it is time to transmit the data, the program execution advances to step 242, at which the timer count for each hour meters is converted into a time period value. That conversion involves multiplying the respective timer count by the interval between instances at which the program processed the signal input for that hour meter. The resultant time periods are then stored temporarily in the memory device 212 of the interface module 202. Then at step 244, all of the timer counts are reset to zero to start accumulating the running times for another reporting period. The microcomputer 210 at step 246 then formulates a message that contains the hour meter time period and that message is sent via the communication link 204 to the data acquisition device 66 at step 248. In this manner, the data acquisition device 66 receives the parameter data from the interface module 202 in the same manner as the data acquisition device 66 in FIG. 2 receives messages from the vehicle controller 21 via the internal vehicle communication network 26. Thus, the identical type of data acquisition device 66 can be used with vehicles for which it was designed to connect to the network port 65 and with vehicles of other manufacturers that have an incompatible communication network 26. Furthermore, the unique manner in which the signal inputs for the input circuit 216 are dynamically configured allows the interface module 202 to be used with a wide variety of different types of industrial vehicles and receive signals for various operating parameters on those vehicles.

The foregoing description was primarily directed to a certain embodiments of the industrial vehicle. Although some attention was given to various alternatives, it is anticipated that one skilled in the art will likely realize additional alternatives that are now apparent from the disclosure of these embodiments. Accordingly, the scope of the coverage should be determined from the following claims and not limited by the above disclosure.

The invention claimed is:

1. A system for acquiring performance data from industrial vehicles having different respective standardized communication protocols, wherein a first industrial vehicle includes a first vehicle controller operatively connected to control a plurality of components and configured to communicate using a first vehicle communication network and adapted to transmit vehicle data using a first standardized network communication protocol, wherein a second industrial vehicle includes a second vehicle controller operatively connected to control a second plurality of components and configured to communicate using a second vehicle communication network and adapted to transmit second vehicle data using a second standardized network communication protocol, said system comprising:

a data acquisition module not compatible with the first standardized communication protocol of the first industrial vehicle to receive the vehicle data, the data acquisition module having a port adapted to removably connect to the second standardized communication network of the second industrial vehicle and receive vehicle data that is transmitted using the second standardized network communication protocol, and the data acquisition module having a communicator for wirelessly transmitting the vehicle data; and an interface module having an input for connecting to an output signal from at least one of the plurality of components on the first industrial vehicle, the plurality of components on the first industrial vehicle in communication with the first vehicle controller via the first vehicle communication network, wherein the interface module derives the vehicle data from the output signal, and communicates the vehicle data using a network interface removably connected to the port to convey the vehicle data to the data acquisition module using the second standardized network communication protocol.

2. The system as recited in claim 1 wherein the communicator periodically transmits the vehicle data.

3. The system as recited in claim 1 wherein the interface module has a plurality of inputs for connecting to a plurality of output signals from the plurality of components on the first industrial vehicle in communication with the first vehicle controller via the first vehicle communication network; and further comprising a storage device containing an input mapping table designating a relationship between each of the plurality of inputs and each of the plurality of components.

4. The system as recited in claim 3 wherein at least one of the plurality of components comprises a sensor.

5. The system as recited in claim 3 wherein the interface module has a programming port for connection to a device for changing the input mapping table.

6. The system as recited in claim 1 wherein the interface module derives the vehicle data from the output signal by measuring an amount of time that the signal is active.

7. The system as recited in claim 1 wherein the communicator transmits the vehicle data in response to occurrence of a predefined event.

8. The system as recited in claim 1 wherein the interface module further comprises:
   a processor connected to the network interface; and
   an input circuit connected to the processor and having a plurality of inputs for receiving a plurality of output signals from the plurality of components on the first industrial vehicle in communication with the first vehicle controller via the first vehicle communication network.

9. The system as recited in claim 1 further comprising:
   a first communication circuit connected to another component on the first industrial vehicle for sending data messages through a power line through which electrical power is supplied to the first industrial vehicle components; and
   a second communication circuit for receiving the data messages that were sent through the power line.

10. A system for acquiring performance data from industrial vehicles having different respective standardized communication protocols, wherein a first industrial vehicle includes a first vehicle controller operatively connected to control a plurality of components and configured to communicate using a first vehicle communication network and adapted to transmit vehicle data using a first standardized network communication protocol, wherein a second industrial vehicle includes a second vehicle controller operatively connected to control a second plurality of components and configured to communicate using a second vehicle communication network and adapted to transmit second vehicle data using a second standardized network communication protocol, said system comprising:
    a data acquisition module not compatible with the first standardized communication protocol of the first industrial vehicle to receive the vehicle data, the data acquisition module having a port adapted to removably connect to the second standardized communication network of the second industrial vehicle and receive vehicle data that is transmitted using the second standardized network communication protocol, and the data acquisition module having a communicator for wirelessly transmitting the vehicle data; and
    an interface module separate from the first vehicle controller and having a plurality of inputs for connecting to a plurality of output signals from the plurality of components on the first industrial vehicle, the plurality of components on the first industrial vehicle in communication with the first vehicle controller via the first vehicle communication network, wherein the interface module derives the vehicle data from the plurality of output signals, and communicates the vehicle data using a network interface removably connected to the port to convey the vehicle data to the data acquisition module using the second standardized network communication protocol.

11. The system as recited in claim 10 wherein the interface module further comprises a storage device containing an input mapping table designating a relationship between each of the plurality of inputs and each of the plurality of components.

12. The system as recited in claim 11 wherein the interface module has a programming port for connection to a device for changing the input mapping table.

13. The system as recited in claim 10 wherein the interface module derives the vehicle data from at least one of the output signals by measuring an amount of time that the at least one of the output signals is active.

14. The system as recited in claim 10 wherein the interface module comprises:
    a processor connected to the network interface; and
    an input circuit connected to the processor and having the plurality of inputs.

15. The system as recited in claim 10 wherein the communicator periodically transmits the vehicle data.

16. The system as recited in claim 10 wherein the port of the data acquisition module is isolated from the plurality of output signals in communication with the first vehicle controller.

* * * * *